(12) United States Patent
Perani et al.

(10) Patent No.: US 6,784,896 B1
(45) Date of Patent: Aug. 31, 2004

(54) COLORIZATION OF A GRADIENT MESH

(75) Inventors: Michael J. Perani, San Rafael, CA (US); Yong Joo Kil, San Francisco, CA (US)

(73) Assignee: Virtual Mirror Corporation, San Rafael, CA (US)

( * ) Notice: Subject to any disclaimer, the term of this patent is extended or adjusted under 35 U.S.C. 154(b) by 135 days.

(21) Appl. No.: 10/287,906

(22) Filed: Nov. 4, 2002

(51) Int. Cl.$^7$ .............................................. G09G 5/02
(52) U.S. Cl. ..................... 345/589; 345/423; 345/582
(58) Field of Search ............................... 345/589, 582, 345/423, 426, 427

(56) References Cited

U.S. PATENT DOCUMENTS

| | | | | |
|---|---|---|---|---|
| 5,592,599 A | * | 1/1997 | Lindholm | 345/427 |
| 6,271,861 B1 | | 8/2001 | Sargent et al. | 345/432 |
| 6,313,840 B1 | | 11/2001 | Bilodeau et al. | 345/423 |

OTHER PUBLICATIONS

Richard Shoup, "SuperPaint: An Early Frame Buffer Graphics System", IEEE Annals of the History of Computing, vol. 23, No. 2, Apr.–Jun. 2001, pp. 32–37.

Henri Gouraud, "Computer Display of Curved Surfaces," PhD dissertation, University of Utah, Salt Lake City, 1971, 81 pages.

Bui–Thong Phong, "Illumination for Computer Generated Pictures", Communications of the ACM, vol. 18, No. 6, (1975) pp. 311–317.

James F. Blinn and Martin E. Newell, "Texture and Reflection in Computer Generated Images", Communications of the ACM, vol. 19, No. 10 (1976), pp. 542–547.

Pat Hanrahan and Paul Haeberli, "Direct WYSIWYG Painting and Texturing on 3D Shapes", Computer Graphics (Proc. SIGGRAPH 90), vol. 24, No. 4 (1990), pp. 215–223.

David Benson and Joel Davis, "Octree Textures", ACM Transactions on Graphics (Proc of SIGGRAPH), vol. 21, No. 3, (Jul., 2002), pp. 785–790.

Alvy Ray Smith, "Paint", Tutorial: Computer Graphics Second Edition. 1982, John C. Beatty and Kellogg S. Booth editors, IEEE Catalog No. EHO194–1 (1982), pp. 501–515.

Adobe Systems Inc., "Adobe Illustrator 9.0 User Guide" (2000), pp. 24–28, 101–111, 155–160, 173–196, 227–233, and 369.

(List continued on next page.)

*Primary Examiner*—Matthew Luu
(74) *Attorney, Agent, or Firm*—Silicon Valley Patent Group LLP

(57) ABSTRACT

Methods and apparatus, including computer program products, implementing techniques for performing colorization of the control points of vector objects in an image represented by digital data. A representation of a digital image is received. The image includes vector objects, and each of the objects is specified by an assemblage of control points each possessing a color. An image sampling utility, a gradient sampling utility, and a mesh painting utility are provided for interactive editing of the image by the user. The image sampling utility, gradient sampling utility, and mesh painting utility have graphical extents and apply a colorization function to control points within that extent, whereby when the control points have been colorized the graphical representation of the vector object is generated.

29 Claims, 6 Drawing Sheets

OTHER PUBLICATIONS

Adobe Systems Inc., "Adobe Photoshop 6.0 User Guide" (2000), pp. 16–19, 26–29, 91–92, 139–148, and 161.

Adobe Systems Inc., "Adobe Photoshop 6.0 Online Help" as installed from the Adobe Photoshop 6.0 CD, (2000), sections Painting >Using the Painting Tools; Painting>Customizing Brush Libraries; Painting>Customizing Brush Libraries>Creating and Editing Brushes; Painting>Customizing Brush Libraries>Setting Brush Options; Painting>Setting Options for Painting and Editing Tools>Specifying Opacity; Pressure; or Exposure; Painting>Using the Gradient Tools; Painting>Using the Gradient Tools>Creating Gradient Fills; Painting>Filling and Stroking Selections and Layers>Filling a Selection or Layer with Colors or Patterns; Transforming and Retouching>with a Sample of an Image; Transforming and Retouching>Retouching with a Sample of an Image>Using the Clone Stamp Tool; Transforming and Retouching>Using the Other Retouching Tools>Using the Toning Tools; Transforming and Retouching>Using the Other Retouching Tools>Using the Sponge Tool, 21 pages.

* cited by examiner

COLORIZATION OF A GRADIENT MESH

CROSS-REFERENCE TO COMPUTER PROGRAM LISTING APPENDIX

Appendix A contains the following files in one CD-R (of which two identical copies are attached thereto), and is part of the present disclosure and is incorporated by reference herein in its entirety.

Volume in drive D is 021101_1847
Volume Serial Number is 966D-05D4
Directory of D:\
11/01/2002 11:00a 96,583 SRCGUI.TXT
11/01/2002 11:00a 290,949 SRCGUT.TXT
   2 File(s) 387,532 bytes
Total Files Listed:
   2 File(s) 387,532 bytes
   0 Dir(s) 0 bytes free The files of Appendix A form source code of computer programs for an illustrative embodiment of the present invention.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

This invention relates to computer graphics applications.

Photorealism in computer generated graphics has historically tended toward two approaches: one involving modeling three dimensional (3-D) objects, lights, and cameras and performing the computations necessary to simulate the propagation of light, and the other, two dimensional (2-D) paint systems based on digital image acquisition, compositing and retouching. Heretofore, photorealism in two dimensional vector illustration systems has been achieved only by large investments of time by those very skilled in the art. An embodiment of the invention described herein provides a means of rapidly and intuitively creating vector illustrations that approach the representational clarity of 2-D paint and 3-D modeling systems.

The invention of 2-D paint systems is generally attributed to Richard Shoup in 1972 while at Xerox's Palo Alto Research Center. Commercial paint systems incorporating digital image input and retouching capabilities became available in mid 1980's with systems such as the Artron Studio Computer from Artronics Inc, South Plainfield N.J. One of the key features of computer paint systems is the ability of a user to manipulate collections of the elements which comprise the image, pixels, with retouching tools that adjust the color components of the pixels, as for example, a darkening tool.

Early solutions to convincing representations of 3-D scene geometry were achieved by Henri Gouraud in "Computer Display of Curved Surfaces," PhD dissertation, University of Utah, Salt Lake City, 1971, and Bui-Thong Phong in "Illumination for computer generated images" Communications of the ACM, 18:311—317, 1975. These systems included mechanisms for creating 3-D object geometry in the form of parametric surfaces, positioning lights and cameras in a virtual 3-D scene, and modeling the light reflected from the surface toward the camera. These early systems are still remarkable in that they produce fairly convincing results for diffuse surfaces at low computational cost. Two of the key features of these systems are: the ability to define 3-D parametric surfaces as m×n collections of control vertices, and the ability to render polygonized surfaces with bilinear interpolation of the vertex information.

Since the development of these early systems, ever more detailed renderings have been achieved with a combination of more physically correct modeling techniques and more powerful procedural descriptions of surface detail. One such procedural technique pertinent to this discussion is texture mapping introduced by James Blinn in "Texture and reflection in computer generated images" Communications of the ACM, 19(10):542—547, 1976. 3. Texture mapping maps locations in a 2-D image to 3-D parametric surface control vertices. This is achieved by normalizing the u,v vertex coordinates by the parametric dimension (m,n) to the unit square. Pixel locations in the source image are similarly normalized by the dimension of the image. The color at a 3-D vertex with a particular normalized coordinate is determined by the pixel value at that same normalized coordinate in the image. The texture coordinates for arbitrary positions on the parametric surface are derived from those at the vertices.

Another technique of setting the color information of 3-D surface vertices is with a 3-D paint program. In a 3-D paint program, the user is not restricted to the plane of an image, but rather positions an object and paint brush in 3-space and deposits paint directly on the 3-D surface. The deposited paint is stored in one or more 2-D images stored as texture maps as discussed in "Direct WYSIWYG Painting and Texturing on 3D Shapes". Computer Graphics (Proc. SIGGRAPH 90), 24(4):215—223, August 1990 by Hanrahan and Haeberli, or alternatively as a level set in an texture octree as in "Octree Textures" ACM Transactions on Graphics (Proc of SIGGRAPH), 21(3):785–790 by Benson and Davis.

One of the primary attractions of vector illustration systems is that they can produce very sharp text and graphics on a printed page. One of the hallmarks of paint and 3-D systems is the ability to represent objects with smooth color transitions and surface detail. Representation of these types of objects in a vector illustration system is generally at odds with the system's imaging architecture. Illustrations combining sharp text and graphics with smoothly shaded objects predate the use of digitai technology, and are a highly desirable feature of a computer drawing system.

A variety of techniques are employed in vector illustration systems to represent smooth objects, with the three most common techniques being: shape blends, gradients, and gradient meshes. A shape blend is achieved when the color and topology of two shapes are interpolated with a series of in-between objects to create a smooth transition. The smoothness of the transition is dependent on the number of in-between objects. With gradients, a sequence of colors (stops) and their relative separations, along with a transition direction, is established and a single object is shaded with a color ramp that interpolates the stops. Note, that these gradients are generally represented as procedural objects within a page description. When the page description is parsed by a raster image processor for rendering, these procedural objects are expanded in a way very similar to a shape blend with multiple interpolated objects. Both shape blends and gradients are very limited in the types of smooth color transitions that can be represented, thus providing the motivation for the third technique, gradient meshes. Gradient meshes are analogous to parametric surfaces in that they provide an assemblage of control points organized in a normalized u, v coordinate system. In a technique similar to Gouraud shading, the colors at arbitrary positions in a subset of a gradient mesh (a gradient mesh patch) are interpolated from the colors of neighboring control points. Similar to the rendering of surfaces in a 3-D system, a gradient mesh is rasterized at a resolution appropriate for the target output device.

The two existing techniques for establishing the colors at gradient mesh control points are: identifying a subset of control points through a selection and then performing a color edit, and application of a pre-defined color to a mesh control point, or mesh patch. In the case of the application of color to a patch, the edit is performed by storing the pre-defined color at all the control point neighbors defining the patch. These techniques make it quite labor intensive to edit gradient meshes of more than marginal complexity. An embodiment of the invention described herein addresses these inadequacies with a number of new editing techniques, and allows the creation of very complex gradient meshes that achieve the stated goal of photorealism in a fashion that is both intuitive and responsive to a computer artist.

SUMMARY

The present invention implements and uses techniques for performing colorization computer graphics operations on an image represented by digital data. The image includes vector objects, and each of the objects is specified by an assemblage of control points each possessing a color. In accordance with different embodiments of the present invention an image sampling utility, a gradient sampling utility, and a mesh painting utility may be used for interactive editing of the image by the user. The image sampling utility, gradient sampling utility, and mesh painting utility, for example, have graphical regions of influence. The colorization function is applied to control points within the extent of the region of influence, whereby when the control points have been colorized, the graphical representation of the vector object is generated.

One embodiment of the present invention includes a computer program product for performing computer graphics operations on an image represented by digital data. The computer program product is tangibly embodied in a computer-readable medium and includes instructions to cause a programmable processor to operate. The instructions cause the processor to receive a representation of a digital image, which includes at least one drawing object organized into a page description. The drawing object includes a gradient mesh that is specified by control points, which have attributes of position on the page description and color. The instructions also cause the processor to receive a user input defining events, wherein each event defines a position on the page description and to calculate an extent of the region of influence over the page description based on at least one defined position. The instructions also cause the processor to recalculate an extent of the region of influence for additional defined events, and perform a colorization function for each control point lying within the recalculated extent of the region of influence, wherein the programmable processor regenerates the gradient mesh specified by the control points after a colorization function is applied to the control points.

In addition, the present invention may include instructions to cause the processor to receive a user input specifying a sampling source. The instructions to perform a colorization function include instructions to obtain color samples at the control point positions from the sampling source, calculate a weighted color combination of the sample color and control point color, and apply the weighted color combination to the control point color.

In addition, the present invention may include instructions to cause the processor to provide an extent profile, the extent profile specifying a fractional coverage value for all positions within the extent of the region of influence and to calculate the fractional coverage value for at the position of each control point lying within the extent of the region of influence for each event. The instructions also cause the processor to calculate a cumulative coverage value associated with each control point based on the accumulation of the fractional coverage values calculated for each control point lying within the extent of the region of influence for each event. In one embodiment, the instructions also cause the processor to attenuate the effect of the colorization function using the cumulative coverage value. In another embodiment the instructions also cause the processor to incorporate the cumulative coverage values into the calculation of the weighted color combination.

Another embodiment of the present invention includes a method for colorizing a gradient mesh. The method includes providing a representation of a digital image comprising at least one drawing object organized into a page description, the drawing object comprising a gradient mesh that is specified by control points, the control points having attributes of position on the page description and color; producing user defined events, wherein each event defines a position on the page description; determining an extent of the region of influence over the page description for colorizing based on at least one defined position; colorizing each control point lying within the extent of the region of influence; determining additional extents of the region of influence for additional defined events; colorizing each control point lying within the additional extents of the region of influence; and regenerating the gradient mesh specified by the control points after colorizing the control points.

In addition, the method may include providing a sampling source, wherein colorizing includes obtaining color samples from the sampling source at the control point positions; determining a weighted color combination of the sample color and control point color; and applying the weighted color combination to the control point color.

In addition, the method may include specifying a fractional coverage value for all positions within the extent of the region of influence; determining the fractional coverage value for each control point lying within the extent of the region of influence for each event; determining a cumulative coverage value associated with each control point based on the accumulation of the fractional coverage values determined for each control point lying within the extent of the region of influence for each event. In one embodiment, the method includes attenuating the effect of colorizing using the cumulative coverage value. In another embodiment, the method includes incorporating the cumulative coverage values into the calculation of the weighted color combination.

The details of one or more embodiments of the invention are set forth in the accompanying drawing and descriptions below. Other features, objects, and advantages of the invention will be apparent from the description and drawings, and from the claims.

DETAILED DESCRIPTION

The invention will now be described in greater detail by way of example. First a general description of the application architecture will be given. This general description will be followed by individual sections for each of the methods of gradient mesh colorization.

The definition of a gradient mesh was previously given loosely as an assemblage of control points organized in a normalized u, v coordinate system. In order to explain the term gradient mesh in greater detail, it will be useful to start with the definition of a grid and the definition of a mesh.

A "grid" is an M×N array of "lattice points". Each lattice point in the grid has a position and four tangents vectors, one in each of the positive and negative u and v directions respectively. One exception is lattice points on the edge of the grid, which have fewer tangents. The position of the tangent vectors define curves connecting each pair of adjacent lattice points in the grid.

Figure 6:
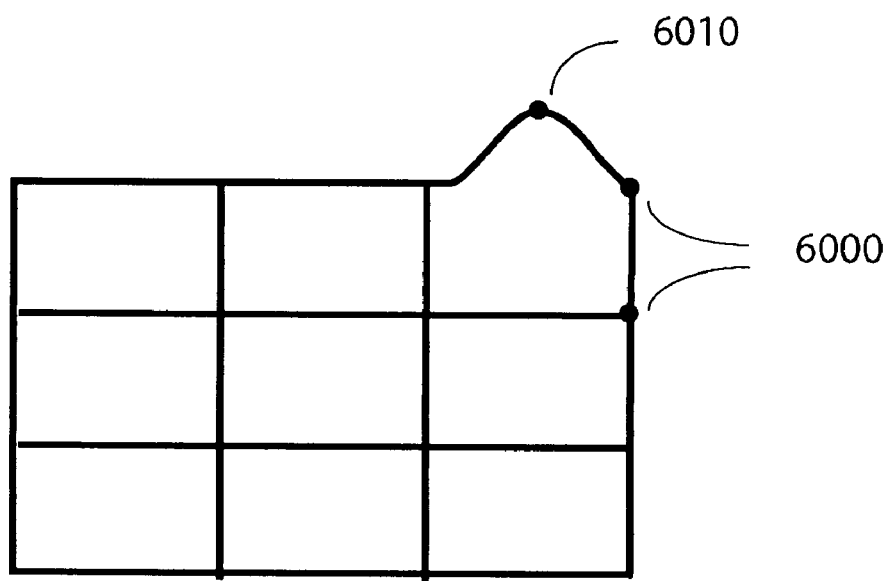
FIG. 6 is a schematic illustration of a mesh.

A "mesh" is a grid that may have extra "anchor points" (6010) between the existing lattice points (6000), as shown in FIG. 6. These anchor points are either in the positive and negative u direction or the positive and negative v direction, depending on whether the curve on which the anchor point is located connects points that have a common u or a common v coordinate.

A "gradient mesh" is a mesh which has colors associated with each lattice and anchor points, henceforth referred to collectively as "control points". The visual representation of the gradient mesh is computed by interpolating the colors defined at the control points.

The present implementation is not a stand alone drawing application, but rather an addition to an existing drawing application, such as Adobe Illustrator, which features an extensible and open plug-in architecture. The existing drawing application, or host drawing application includes standard features such as hierarchical object list management, shape creation utilities, and object control point editors. The drawing application typically includes facilities for maintaining a page description containing one or more gradient meshes, and one or more graphical objects serving as a color source which may be in the form of images, and facilities for maintaining a library of gradients. The drawing application also has a messaging protocol, propagating a sequence of events from the computer mouse. with each event possessing a position and actions on the mouse buttons or mouse itself, for example mouse down, drag, and up.

In the following description, a "gradient" shall be defined as a sequence of colors (color stops) and their relative separations, along with a transition direction. An "image" shall be defined as an M×N array of pixels containing color information with an optional matrix transformation applied thereto. The "host drawing application" shall be defined as an existing drawing application which features an extensible and open plug-in architecture to which an embodiment of the invention is added. The "extent" of an operation shall be defined as a region of influence over the page description. Throughout the document the computer pointing device has been referred to as a mouse for convenience. The term "mouse" should be construed to imply a plethora a user input devices including, but not limited to: a mouse, a trackball, a pen, a touch sensitive screen, and touch sensitive tablet.

User control and artistic expressiveness can be enhanced through the following features. Mapping of images to the colors of control points of a gradient mesh allows for near-photorealistic graphics within a vector page description. Mapping of images or graphic objects to the colors of control points of a gradient mesh allows for maintaining consistent color themes in a page description. Mapping of a gradient to the colors of control points of a gradient mesh allows for rapidly and intuitively providing smoothly shaded objects with a single operation. Providing a user controllable weighting intensity of the mapping operations allows the user to achieve a wide range of visual effects. Interactive painting of the control points of a gradient mesh allows users to create vector objects resembling traditional smooth shading media such as air brushes in a resolution independent vector illustration system. Interactive adjustments of the control points of a gradient mesh with operations such as lighten, brighten, darken, saturate, and desaturate provide a means of approximating natural lighting effects such as highlights and shadows in a resolution independent vector illustration system. Providing a mesh painting brush with a extent centered about position of the computer pointing device with a profile falling to zero at the extremes of the extent, and a user controllable brush intensity, gives the user the capability of achieving very subtle color manipulations. The display of visual cues reflecting the application of the colorization utilities provides the user with the visual feedback necessary to edit a multitude of control point colors simultaneously.

The following four sections describe the gradient mesh color editing system and three exemplary customizations thereof: image sampling, gradient sampling, and mesh painting. Schematic diagrams for the flow of control for the color editor, image sampling, gradient sampling, and mesh painting are shown in FIGS. 1, 2, 3, and 4. Following the mesh painting section there are three subsections specific to mesh painting entitled: brush extent and profile, brush intensity, and brush operations.

Gradient Mesh Color Editor

Figure 1:
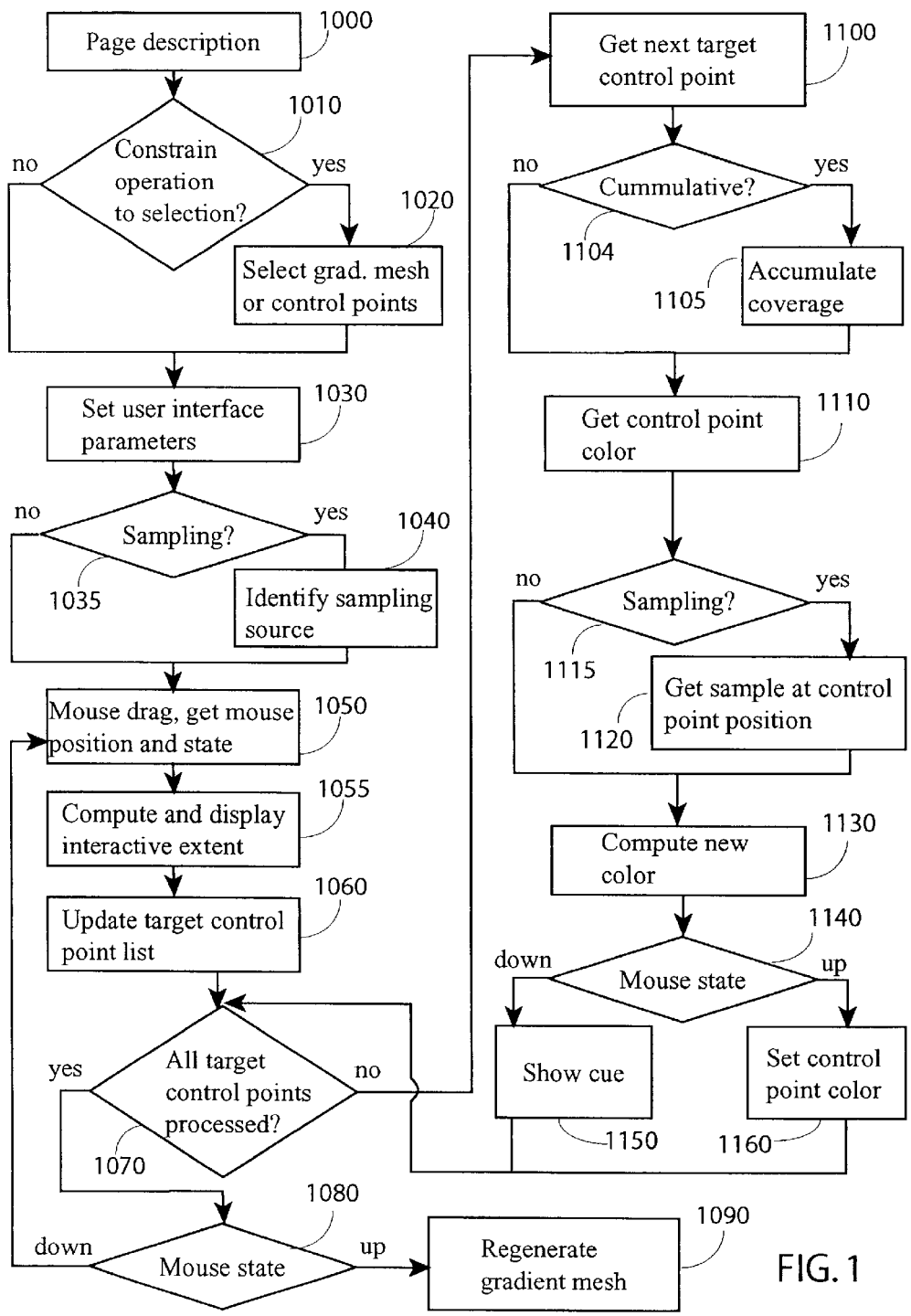
FIG. 1 is a block diagram of the application of color editing to colorize the control points of a gradient mesh in accordance with an embodiment of the present invention.

The flow of control for the gradient mesh color editor is shown in FIG. 1. The colorization editor can be customized to realize a variety of gradient mesh colorization techniques. There are four principal functional blocks in the colorization editor: the input block consisting of the page description and any selections the user makes (1000–1020), the extent and target list calculation block which iteratively calculates the extent of the colorization operations and maintains the target control list, the list of gradient mesh control points to colorize (1050–1080), the colorization block which colorizes each control point in the target list (1100–1160), and the regeneration block which regenerates the gradient mesh based on the gradient mesh's control points' new colors (1090). The input block (1000–1020) and regeneration block (1090) are controlled by the host drawing application.

Some embodiments of the color editor are cumulative, where the colorization result depends on a cumulative evaluation of the extent at each position in a mouse drag event sequence. While the evaluation of an extent is binary, that is, locations on the page are either inside or outside of the extent, cumulative embodiments of the invention include a facility for attenuating the coverage of a colorization operation locally within the extent. In this way, operations with soft edges, such as air-brush effects can be realized. One implementation of a cumulative effect is achieved by having an extent profile which defines a fractional coverage value for all positions within the extent. Cumulative coverage values can be computed at each control point position by evaluating the extent profile at the position to obtain the fractional coverage value for each event in a mouse drag event sequence, and taking the sum of the fractional coverage values. Cumulative coverage values are clamped to a maximum of 100% coverage (1104–1105).

Some embodiments of the color editor require a sampling source (1035–1040) to provide sample colors with which to perform a weighted average with the current control point colors (1115–1120). Other embodiments do not sample and simply shift colors based on various mathematical expressions.

The input to the color editor is a page description with one or more gradient meshes residing thereon (1000), which is created with the host drawing application. The user may identify the gradient mesh or meshes, or a subset of their control points to be colorized, by selecting them with the host drawing application's selection utilities (1020). The user may also choose to have no selections (1010). If no selections are present, any gradient mesh on the page description may be considered a candidate for colorization.

The user establishes parameters to the colorization operation through a graphical user interface (1030). The parameters presented in the graphical user interface depend on a particular embodiment, and may include parameters such as: blend intensity, gradient type, and brush size. If the operation requires a sampling source (1035), the user identifies the object to serve as the sampling source (1040). The sampling source may be a graphical object residing within the page description, or a procedural object synthesized dynamically based on user inputs through a graphical interface (1030) and mouse drag positions (1050). The user may drag the mouse (1050) to specify regions of the page description that will be affected by the operation by positioning an interactive display of the extent (1055) of the operation over the page description.

For each event, the targeted control point list, the list which holds control points which will undergo colorization, is updated (1060). For each event, control points are targeted by performing a comparison of the extent of the operation with, first the extent of the gradient mesh object itself, and then of the gradient mesh object's control points. Only control points lying within the extent of the operation are targeted. If the operation is cumulative, targeted control points remain in the target control point list until the mouse is released.

If the operation is cumulative, for each targeted control point (1070 and 1100), a coverage value at that point is calculated (1105). For each targeted control point, the current color of the control point is retrieved (1110). If the operation does not require a sampling source, a combination of the control point's current color and the color resulting from the particular operation is computed (1130). If a sampling source is required, the corresponding location in the sampling source is sampled (1120), and a weighted combination of the control point's color with the color sampled from the sampling source is computed (1130). These combinations may be linear or some other mathematical expression and if the operation is cumulative, are weighted by the control point's coverage values.

During the mouse drag (1140), interactive visual cues of the computed color are displayed (1150). In one implementation, the visual cue is a small square positioned at the coordinate of the control point. When the mouse is released (1140), the control point color is updated with the computed color (1160). When all the targeted control points have been processed (1070), and the mouse has been released (1080), the gradient mesh or meshes are regenerated based on the new control point colors (1090). This regeneration of the gradient meshes is performed by the host drawing application.

Depending on the performance and capabilities of the host machine and application, the flow differs. On high performance systems, the display of visual proxies (1150) is unnecessary as the gradient mesh can be regenerated at interactive rates. In this case, the control points colors are set (1160) regardless of mouse state (1140). The regeneration of gradient meshes (1090) then also occurs inside the loop processing the targeted control point list (1070).

On some systems, the step of retrieving the sample from the image source (1120) can be quite expensive. This is particularly true if the sampling source is not an image, but rather another graphical object that must be evaluated at an arbitrary position. In this case, it is prohibitively expensive to display interactive cues, and the entire loop processing the targeted control point loop (1070) is bypassed until the mouse is released.

Image Sampling

Figure 2:
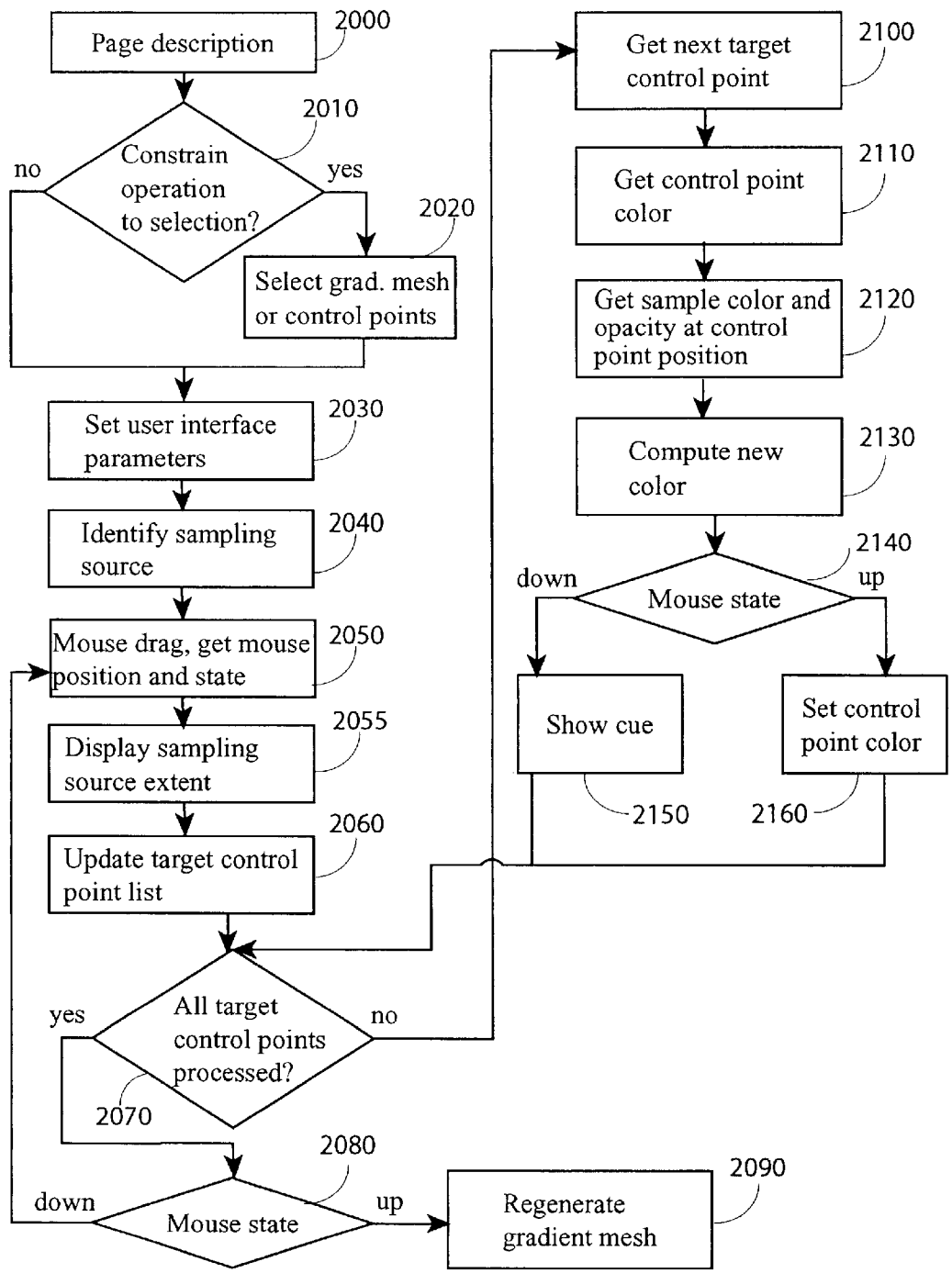
FIG. 2 is a block diagram of the application of image sampling to colorize the control points of a gradient mesh in accordance with an embodiment of the present invention.

The flow of control for image sampling is shown in FIG. 2. The input to the system is a page description with one or more gradient meshes residing thereon (2000), which is created with the host drawing application. The user may identify the gradient mesh or meshes, or a subset of their control points to be colorized, by selecting them with the host drawing application's selection utilities (2020). The user may also choose to have no selections (2010). If no selections are present, any gradient mesh on the page description may be considered a candidate for colorization.

In one implementation, the user establishes the parameters to the image sampling operation through a graphical user interface (2030). Parameters such as the blend intensity are set therein. The user then identifies the graphical object to serve as the sampling source (2040). The sampling source may be an image, or alternatively any graphical object capable of residing within the page description. After the user has identified the image sampling source, he may use the mouse to drag (2050) the sampling source to a particular alignment with the gradient mesh by positioning an interactive display of the image sampling source's extent (2055).

For each event, the targeted control point list, the list which holds control points which will undergo colorization, is updated (2060). For each event, control points are targeted by performing a comparison of the extent of the image sampling source with, first the extent of the gradient mesh object itself, and then of the object's control points. Only control points lying within the extent of the image are targeted. Since the image sampling source can be any graphical object in the page description, the topology of the extent is arbitrary. The extent is confined to regions of the object which make markings on the page description, thus for example, shapes with interior holes may serve as image sampling sources where control points lying coincident with the hole will not be colorized.

For each targeted control point (2070 and 2100), the current color of the control point is retrieved (2110). For each targeted control point, the corresponding location in the sampling source is sampled for both color and opacity, honoring any matrix transformations that may have been performed on the object. In this way, the visual image the user sees corresponds to the colors which are mapped to the control points (2120). A combination of the control point's color with the color sampled from the sampling source, weighted by the blend intensity from (2030) and the sampled opacity is computed (2130). This combination may be linear or some other mathematical expression. During the mouse drag (2140), interactive visual cues of the computed color are displayed (2150). In one implementation, the visual cue is a small square positioned at the coordinate of the control point. When the mouse is released (2140), the control point color is updated with the computed color (2160). When all the targeted control points have been processed (2070), and the mouse has been released (2080), the gradient mesh or meshes are regenerated based on the new control point colors (2090). This regeneration of the gradient meshes is performed by the host drawing application.

Depending on the performance and capabilities of the host machine and application, the flow differs. On high performance systems, the display of visual proxies (2150) is unnecessary as the gradient mesh can be regenerated at interactive rates. In this case, the control point's colors are set (2160) regardless of mouse state (2140). The regeneration of gradient meshes (2090) then also occurs inside the loop processing the targeted control point list (2070).

On some systems, the step of retrieving the sample from the image source (2120) can be quite expensive. This is particularly true if the sampling source is not an image, but rather another graphical object that must be evaluated at an arbitrary position. In this case, it is prohibitively expensive to display interactive cues, and the entire loop processing the targeted control point loop (2070) is bypassed until the mouse is released.

Gradient Sampling

Figure 3:
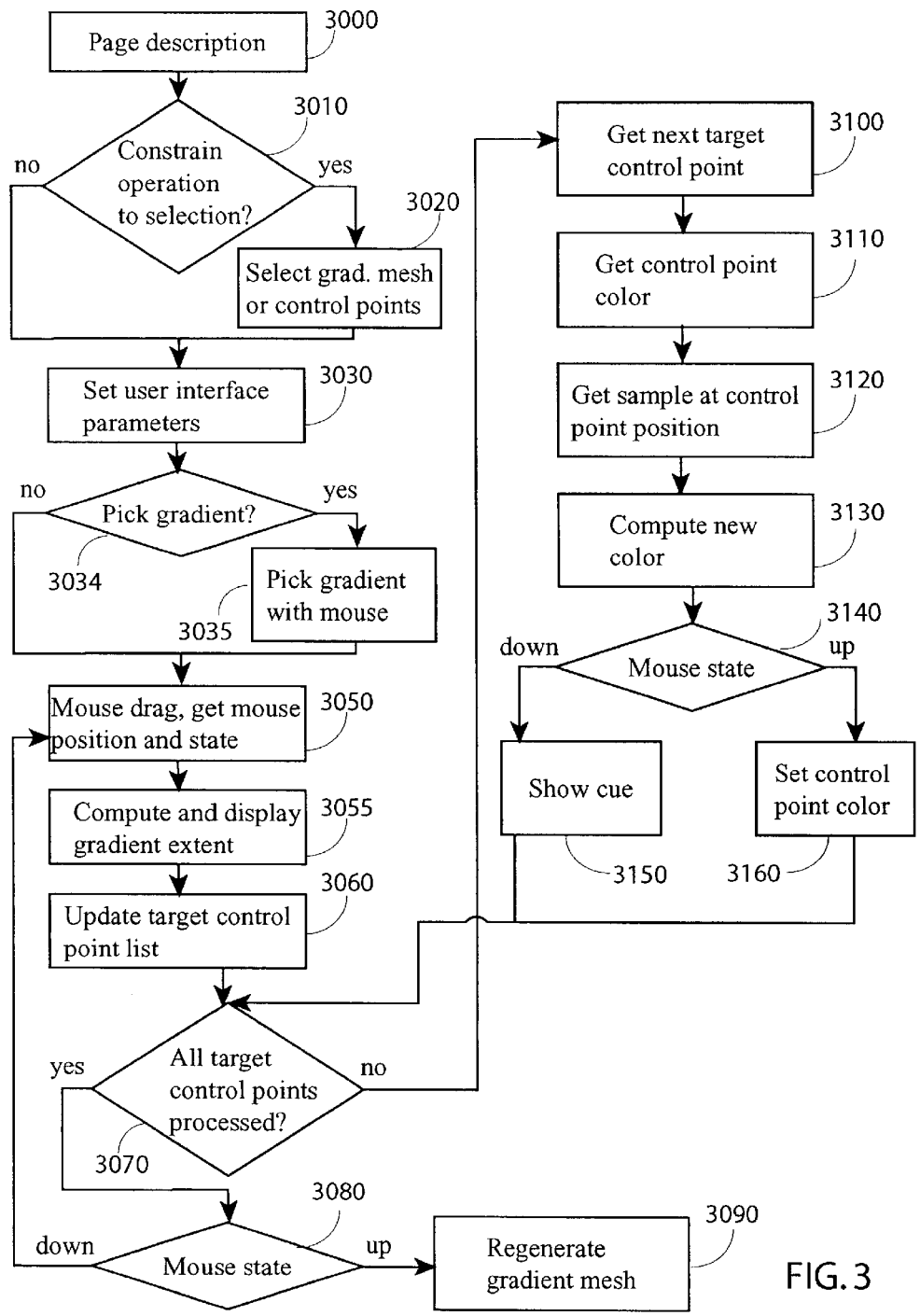
FIG. 3 is a block diagram of the application of gradient sampling to colorize the control points of a gradient mesh in accordance with an embodiment of the present invention.

The flow of control for gradient sampling is shown in FIG. 3. The flow of control in gradient sampling is similar to that of image sampling; the most notable exception is the method of identifying the gradient to use in the sampling operation (3035).

The input to the system is a page description with one or more gradient meshes residing thereon (3000), which is created with the host drawing application. The user may identify the gradient mesh or meshes, or a subset of their control points to be colorized, by selecting them with the host drawing application's selection utilities (3020). The user may also choose to have no selections (3010). If no selections are present, any gradient mesh on the page description may be considered a candidate for colorization.

In one implementation, the user establishes the parameters to the gradient sampling operation through a graphical user interface (3030). Parameters such as the blend intensity, the gradient, and the gradient type are set therein. As well as providing the user a mechanism for choosing the gradient to sample from a visual list displayed in a user interface, an alternate method is to use the mouse to pick a graphical object on the page which is filled with the desired gradient (3035).

Figure 5A:
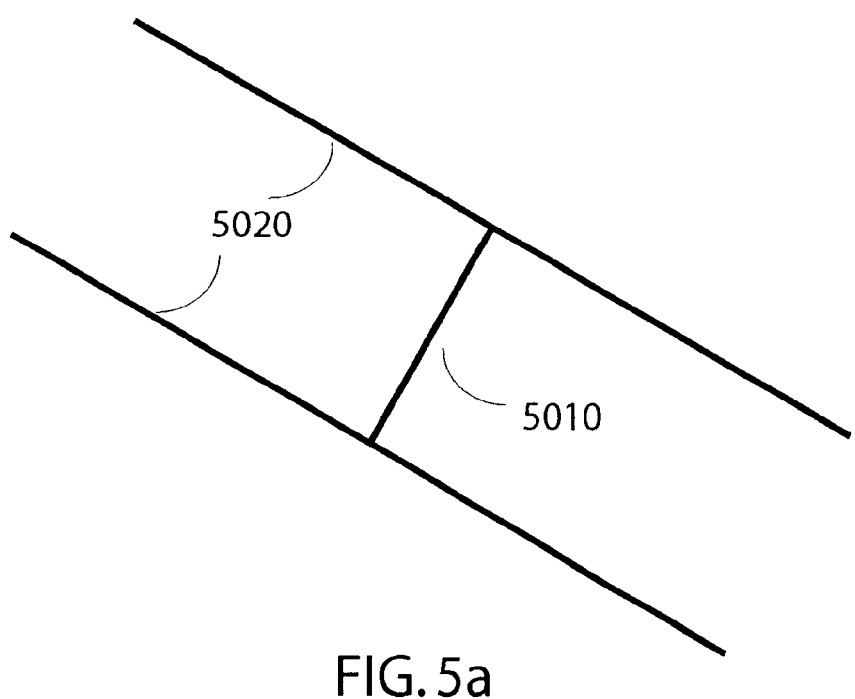
FIG. 5a is a schematic illustration of the visual feedback displayed during linear gradient sampling in accordance with an embodiment of the present invention.
Figure 5B:
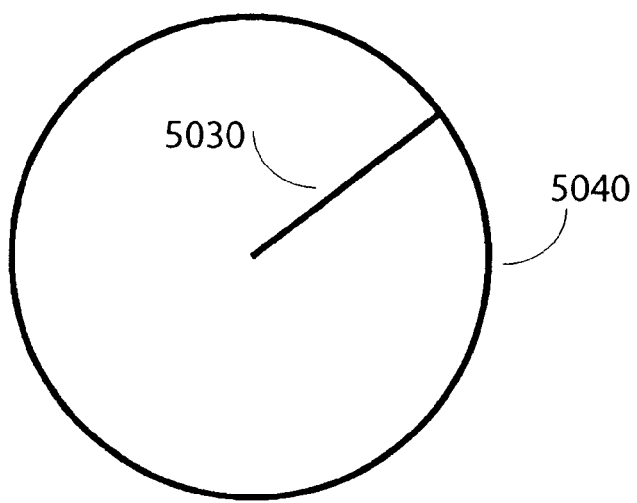
FIG. 5b is a schematic illustration of the visual feedback displayed during radial gradient sampling in accordance with an embodiment of the present invention.

After the user has identified the gradient to sample, the mouse is dragged (3050) to establish the gradient direction and length. For each event associated with a drag of the mouse, the extent of the gradient generation procedure is computed and a visual representation of the extent is displayed (3055). In one implementation, as shown in FIG. 5a, a linear gradient is represented as a line from the point of button depression to the current drag location (5010), with two additional lines perpendicular thereto, each passing through an endpoint and extending to the extent of imagable area of the page (5020). In another implementation, as shown in FIG. 5b, a radial gradient is represented as a line from the point of button depression to the current drag location (5030), with an additional circle centered over the position where the pointing device button was first pressed and passing through the other endpoint (5040).

For each event, the targeted control point list, the list which holds control points which will undergo colorization, is updated (3060). For each event, control points are targeted by performing a comparison of the extent of the gradient with, first the extent of the gradient mesh object itself, and then of the object's control points. Only control points lying within the extent of the gradient are targeted. The extent of the gradient is calculated from the position of the first mouse press, the gradient type, the gradient direction, and the gradient length.

For each targeted control point (3070 and 3100), the current color of the control point is retrieved (3110). For each targeted control point, the corresponding location in the gradient is sampled (3120). A combination of the control point's color with the color sampled from the gradient, weighted by the blend intensity, is computed (3130). This combination may be linear or some other mathematical expression. During the mouse drag (3140), interactive visual cues of the computed color are displayed (3150). In one implementation, the visual cue is a small square positioned at the coordinate of the control point. When the mouse is released (3140), the control point color is updated with the computed color (3160). When all the targeted control points have been processed (3070), and the mouse has been released (3080), the gradient mesh or meshes are regenerated based on the new control point colors (3090). This regeneration of the gradient meshes is performed by the host drawing application.

Depending on the performance and capabilities of the host machine and application, the flow differs. On high performance systems, the display of visual proxies (3150) is unnecessary as the gradient mesh can be regenerated at interactive rates. In this case, the control point's colors are set (3160) regardless of mouse state (3140). The regeneration of gradient meshes (3090) then also occurs inside the loop processing the targeted control point list (3070).

Mesh Painting

Figure 4:
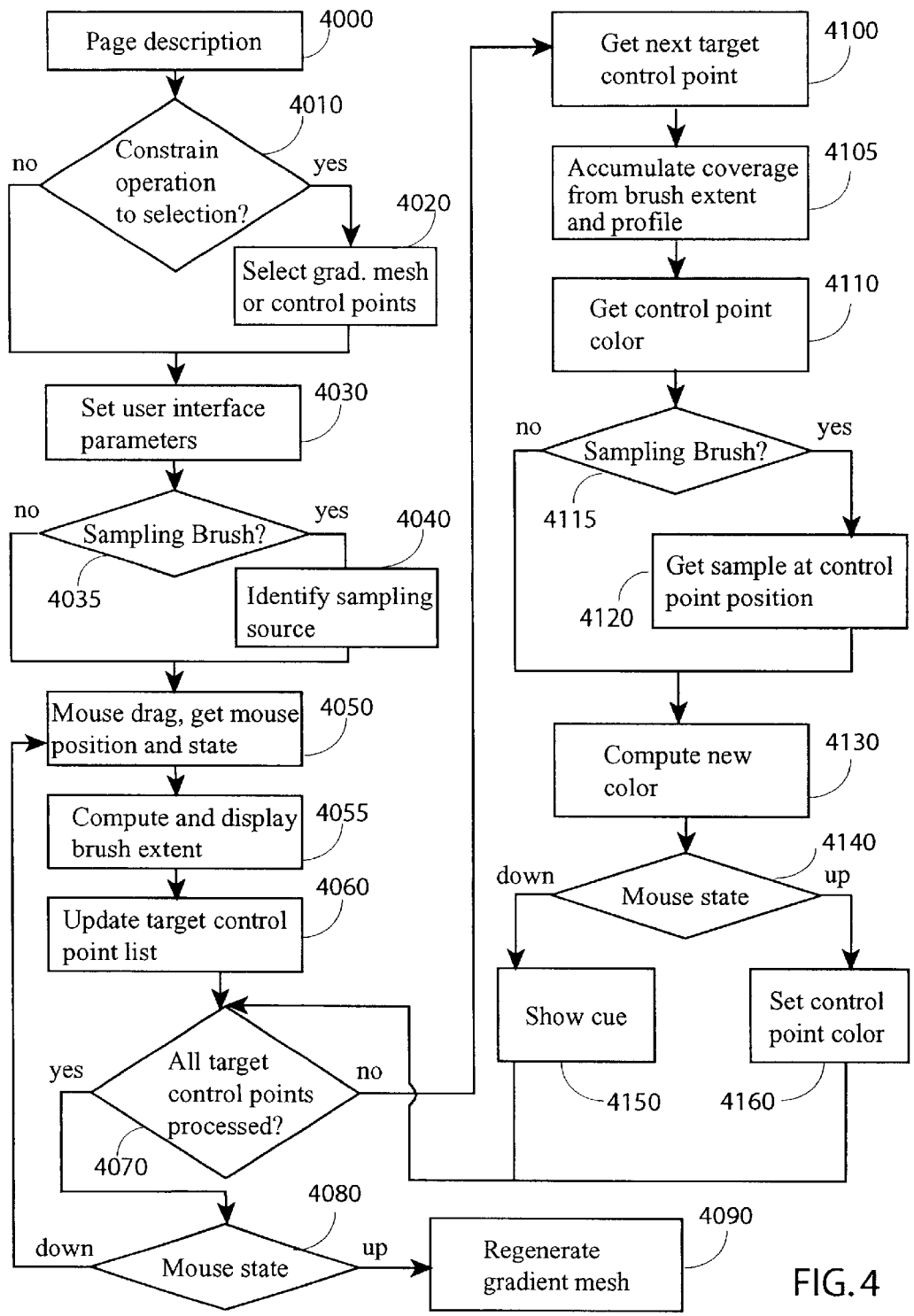
FIG. 4 is a block diagram of the application of mesh painting to colorize the control points of a gradient mesh in accordance with an embodiment of the present invention.

The flow of control for mesh painting is shown in FIG. 4. The flow of control in mesh painting is similar to that of image sampling; the most notable exceptions are that a sampling source is not always necessary (4035 and 4115), and that the overall result is dependent on a cumulative effect of multiple brush extents and profiles (4105).

Mesh painting brushes may be of two forms. One form is a color adjusting brush, where the colorization function for the control points depends at least on the current control points' colors and the user interface parameters. The other from is an image sampling brush which depends at least on the current control points' colors, the user interface parameters, and the color values in an image designated as a sampling source at the positions coincident with the control point positions.

The flow of control for mesh painting is shown in FIG. 4. The input to the system is a page description with one or more gradient meshes residing thereon (4000), which is created with the host drawing application. The user may identify the gradient mesh. or meshes, or a subset of their control points to be colorized, by selecting them with the host drawing application's selection utilities (4020). The user may also choose to have no selections (4010). If no selections are present, any gradient mesh on the page description may be considered a candidate for colorization.

In one implementation, the user establishes the parameters to the mesh painting operation through a graphical user interface (4030). Parameters such as the brush intensity and the brush size are set therein. If the mesh painting brush is an image sampling brush (4035), the user identifies the graphical object to serve as the sampling source (4040). The sampling source may be an image, or alternatively any graphical object capable of residing within the page description.

The mesh painting operation is a cumulative effect of multiple instances of brush extents and profiles centered at the mouse positions received during the drag of the mouse (4050). For each event associated with a drag of the mouse, the brush extent is computed and a visual representation is displayed (4055).

For each event, the targeted control point list, the list which holds control points which will undergo colorization, is updated (4060). For each event, control points are targeted by performing a comparison of the extent of the brush with, first the extent of the gradient mesh object itself, and then of the object's control points. Only control points lying within the extent of the brush are targeted. Mesh painting is different however from image sampling and gradient sampling in that the operation is cumulative. During a mouse drag, control points which have been added to the target list remain in the target list until the mouse is released.

For each targeted control point (4070 and 4100), a coverage value at that point is calculated based on the extent and profile of the brush (4105). The coverage at each control point accumulates, clamped to a maximum of 100%, through successive passes through the target point processing loop (4070).

For each targeted control point, the current color of the control point is retrieved (4110). If the mesh painting brush is a color adjustment brush, a combination of the control point's current color and the color resulting from the particular painting operation is computed (4130). If the mesh painting brush is an image sampling brush (4115), the corresponding location in the sampling source is sampled (4120), and a combination of the control point's color with the color sampled from the sampling source is computed (4130). These combinations may be linear or some other mathematical expression and are weighted by the control point's converge values.

During the mouse drag (4140), interactive visual cues of the computed color are displayed (4150). In one implementation, the visual cue is a small square positioned at the coordinate of the control point. When the mouse is released (4140), the control point color is updated with the computed color (4160). When all the targeted control points have been processed (4070), and the mouse has been released (4080), the gradient mesh or meshes are regenerated based on the new control point colors (4090). This regeneration of the gradient meshes is performed by the host drawing application.

Depending on the performance and capabilities of the host machine and application, the flow differs. On high performance systems, the display of visual proxies (4150) is unnecessary as the gradient mesh can be regenerated at interactive rates. In this case, the control points colors are set (4160) regardless of mouse state (4140). The regeneration of gradient meshes (4090) then also occurs inside the loop processing the targeted control point list (4070).

Brush Extent and Profile

The brush extent is a region of support around the current pointing device position which is used to determine which control points will be influenced by the brush. In one implementation the brush extent can be simply a radius; other implementations include oval or rectangular brushes. The brush profile is a function that attenuates the operation of the brush over the brush extent. In one implementation this brush profile can be a radially symmetric Gaussian distribution, with its apex at the center of the brush which falls off to zero at the edge of the brush extent. The distribution function can be any function that can be evaluated over the brushes extent.

Brush Intensity

The brush intensity may be set via a graphical user interface. The brush intensity and the mesh control point's coverage value computed from the cumulative effect of the brush intensities and profiles during the mouse drag is used to determine the overall strength of the operation of a brush at a particular mesh control point. Brushes of high intensity reach their maximum effect more quickly than brushes of low intensity. As discussed previously, step (4130) performs a combination of the control points' color and a color computed from the user inputs specified in (4030), the coverage at the control point (4105), and the type of brush operation. In one implementation, a strength term is computed from the intensity and coverage and is used as the ratio to weight the color combination, as, for example, in the equation $c3=s*c1+(1-s)*c2$, where s is the strength, c1 is the control point color, and c2 is the color obtained from the brush applied at maximum intensity. Alternate equations and weighting factors also yield desirable results.

Brush Operations

A variety of visual effects can be produced by modifying the algebraic expression used by the brush to set the control point color (4130). One implementation of a brush is a brighten brush which makes the control point color brighter while preserving its hue. Another implementation is a lighten brush which makes a control point color brighter while forcing the color toward white. Another implementation of a brush is a darken brush which makes the control point color darker while preserving its hue. Another implementation is a saturate brush which makes a control point color more vivid by removing gray from the color. Another implementation is a desaturate brush which makes a control point color less vivid by adding gray to the color. Another implementation is a clone brush, which is an example of an image sampling brush, which recolors a control point color from a background object that lies at the same position on the page.

An embodiment of the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural object-oriented programming language, or in assembly or machine language if desired; and in any case, the language can be a compiled or interpreted language. Suitable processors include, by way of example, both general and special purpose microprocessors. Generally, a processor will receive instructions and data from a readonly memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular embodiments. Other embodiments are within the scope of the following claims. For example, the steps of FIGS. 1, 2, 3, and 4 of the invention can be performed in a different order and still achieve desirable results in accordance with an embodiment of the present invention.

What is claimed is:

1. A computer program product for performing computer graphics operations on an image represented by digital data, the product tangibly embodied in a computer-readable medium, the product comprising instructions operable to cause a programmable processor to:

receive a representation of a digital image, the digital image comprising at least one drawing object organized into a page description, the drawing object comprising a gradient mesh that is specified by control points, the control points having attributes of position on the page description and color;

receive a user input defining events, wherein each event defines a position on the page description;

calculate an extent of the region of influence over the page description based on at least one defined position;

perform a colorization function for each control point lying within the extent of the region of influence;

recalculate an extent of the region of influence for additional defined events; and perform a colorization function for each control point lying within the recalculated extent of the region of influence, wherein the programmable processor regenerates the gradient mesh specified by the control points after a colorization function is applied to the control points.

2. The product of claim 1, further comprising instructions to:

receive a user input specifying a sampling source;

wherein the instructions to perform a colorization function comprise instructions to:

obtain color samples at the control point positions from the sampling source;

calculate a weighted color combination of the sample color and control point color; and apply the weighted color combination to the control point color.

3. The product of claim 1 further comprising instructions to:

provide an extent profile, the extent profile specifying a fractional coverage value for all positions within the extent of the region of influence;

calculate the fractional coverage value for at the position of each control point lying within the extent of the region of influence for each event;

calculate a cumulative coverage value associated with each control point based on the accumulation of the fractional coverage values calculated for each control point lying within the extent of the region of influence for each event; and attenuate the effect of the colorization function using the cumulative coverage value.

4. The product of claim 2 further comprising instructions to:

provide an extent profile, the extent profile specifying a fractional coverage value for all positions within the extent;

calculate the fractional coverage value for each control point lying within the extent for each event;

calculate a cumulative coverage value associated with each control point based on the accumulation of the fractional coverage values calculated for each control point lying within the extent of the region of influence for each event; and incorporate the cumulative coverage values into the calculation of the weighted color combination.

5. The product of claim 2, wherein the sampling source is a second drawing object residing in the page description.

6. The product of claim 5, wherein the drawing object has a topology and location on the page description, the product further comprising instructions to:

compute the extent of the region of influence from the topology and location of the second drawing object.

7. The product of claim 5, wherein the drawing object has a topology and location on the page description, the product further comprising instructions to:

compute the extent of the region of influence from the topology and location of the second drawing object, and at least one event.

8. The product of claim 6 further comprising instructions to:

receive a user input specifying an intensity; and attenuate the effect of the colorization function using the intensity.

9. The product of claim 2, wherein the sampling source is a gradient having a length, angle, and type.

10. The product of claim 9, further comprising instructions to:

compute the length and angle of the gradient from a first event and a second event; and compute the extent of the region of influence from the length, angle and type of gradient.

11. The product of claim 10 further comprising instructions to:
receive a user input specifying an intensity; and
attenuate the effect of the colorization function using the intensity.

12. The product of claim 3, further comprising instructions to:
receive a user input specifying a brush size; and
adjust the extent of the region of interest based on the brush size specified by the user.

13. The product of claim 3, further comprising instructions to:
receive a user input specifying a brush profile; and
produce a radially symmetric extent profile with a distribution of fractional coverage values.

14. The product of claim 3 further comprising instructions to:
receive a user input specifying an intensity; and
attenuate the effect of the colorization function using the intensity.

15. The product of claim 3, wherein the colorization function includes at least one of a color substitution, brighten, lighten, saturate, desaturate, and darken function.

16. The product of claim 4, wherein the sampling source is a second drawing object residing in the page description.

17. The product of claim 16, further comprising instructions to:
receive a user input specifying a brush size; and
adjust the extent of the region of influence based on the brush size specified by the user.

18. The product of claim 16, further comprising instructions to:
receive a user input specifying a brush profile; and
produce a radially symmetric extent profile with a distribution of fractional coverage values.

19. The product of claim 16, further comprising instructions to:
receive a user input specifying an intensity; and
attenuate the effect of the colorization function using the intensity.

20. The product of claim 16, where the colorization function includes a clone function.

21. The product of claim 1, wherein the user input defining events is received from a computer pointing device.

22. A method of colorizing a gradient mesh, the method comprising:
providing a representation of a digital image comprising at least one drawing object organized into a page description, the drawing object comprising a gradient mesh that is specified by control points, the control points having attributes of position on the page description and color;
producing user defined events, wherein each event defines a position on the page description;
determining an extent of the region of influence over the page description for colorizing based on at least one defined position;
colorizing each control point lying within the extent of the region of influence;
determining additional extents of the region of influence for additional defined events;
colorizing each control point lying within the additional extents of the region of influence; and
regenerating the gradient mesh specified by the control points after colorizing the control points.

23. The method of claim 22, further comprising:
providing a sampling source; and
wherein colorizing comprises:
obtaining color samples from the sampling source at the control point positions;
determining a weighted color combination of the sample color and control point color; and
applying the weighted color combination to the control point color.

24. The method of claim 22, further comprising:
specifying a fractional coverage value for all positions within the extent of the region of influence;
determining the fractional coverage value for each control point lying within the extent of the region of influence for each event;
determining a cumulative coverage value associated with each control point based on the accumulation of the fractional coverage values determined for each control point lying within the extent of the region of influence for each event; and
attenuating the effect of colorizing using the cumulative coverage value.

25. The method of claim 23, further comprising:
specifying a fractional coverage value for all positions within the extent of the region of influence;
determining the fractional coverage value at the position of each control point lying within the extent of the region of influence for each event;
determining a cumulative coverage value associated with each control point based on the accumulation of the fractional coverage values determined for each control point lying within the extent of the region of influence for each event; and
incorporating the cumulative coverage values into the calculation of the weighted color combination.

26. The method of claim 23, wherein said sampling source is a second drawing object residing in the page description, the drawing object having a topology and location on the page description, said method further comprising computing the extent of the region of influence from at least the topology and location of the second drawing object.

27. The method of claim 23, wherein the sampling source is a gradient having a length, angle, and type, said method further comprising:
computing the length and angle of the gradient from a first event and a second event; and
computing the extent of the region of influence from the length, angle and type of gradient.

28. The method of claim 22, further comprising:
specifying a fractional coverage value for all positions within the extent of the region of influence;
determining the fractional coverage value for each control point lying within the extent of the region of influence for each event;
determining a cumulative coverage value associated with each control point based on the accumulation of the fractional coverage values determined for each control point lying within the extent of the region of influence for each event;
specifying a brush size; and
adjusting the extent of the region of interest based on the specified brush size.

29. The method of claim 22, further comprising:

specifying a fractional coverage value for all positions within the extent of the region of influence;

determining the fractional coverage value for each control point lying within the extent of the region of influence for each event;

determining a cumulative coverage value associated with each control point based on the accumulation of the fractional coverage values determined for each control point lying within the extent of the region of influence for each event;

specifying a brush profile; and producing a radially symmetric region of influence profile with a distribution of coverage values.

* * * * *